May 30, 1967 G. J. VOGEL 3,323,127
MULTIPLE TARGET TRACKING SYSTEM
Filed Sept. 1, 1964 2 Sheets-Sheet 1

INVENTOR.
GEORGE J. VOGEL
BY
ATTORNEY
AGENT

INVENTOR.
GEORGE J. VOGEL

3,323,127
MULTIPLE TARGET TRACKING SYSTEM
George J. Vogel, Blossvale, N.Y., assignor to the United States of America as represented by the Secretary of the Air Force
Filed Sept. 1, 1964, Ser. No. 393,796
1 Claim. (Cl. 343—113)

The invention described herein may be manufactured and used by or for the United States Government for governmental purposes without payment to me of any royalty thereon.

This invention relates to multiple-target tracking systems and, more particularly, to correlation of multiple-target radar echoes through the use of two or more crossed line arrays linearly displaced.

Use of line arrays for receiving radar echo signals is well known in the prior art. For one detailed description description of line arrays, see Proceedings of the IRE, vol. 6, January 1958, pp. 67–84, "A High Resolution Radio Telescope for Use at 3.5 M," by B. Y. Mills et al., describing a radio telescope wherein each array comprises 500 half-wave dipole elements arranged in two parallel rows each 125 wavelengths long.

A single line array locates a target in one angular dimension which corresponds to the azimuth angle in mechanical radars. A second line array at right angles to the first line array locates a target also in only one angular dimension; this one, however, corresponds to the elevation angle of mechanical radars. These two angles describe the target direction.

A second target is located in a similar manner. However, if the radar (crossed line arrays) detects both targets at the same time, the radar becomes confused as to which direction angle found by one line array goes with one of the direction angles determined by the second line array. This results in a correlation (identification) problem.

Accordingly, the principal object of the instant invention is to solve this correlation (identification) problem. Basically, this object is accomplished by the utilization of two or more crossed line arrays having their centers in physically different locations.

A single pair of crossed line arrays produces output signals which are processed as a set of simultaneous equations involving the unknowns that describe the target's location of each of the multiple targets. However, a single pair of crossed line arrays will not result in sufficient simultaneous equations to provide the desired individual target identification.

By using a second set of crossed line arrays whose centers are in different physical locations, a new set of output signals are again processed as simultaneous equations results, involving the unknowns that describe the target location, thereby providing sufficient information to determine individual target locations.

Other objects, features and attendant advantages of the present invention will become more apparent to those skilled in the art from the following description and when read in connection with the drawings, wherein.

Figure 1A:
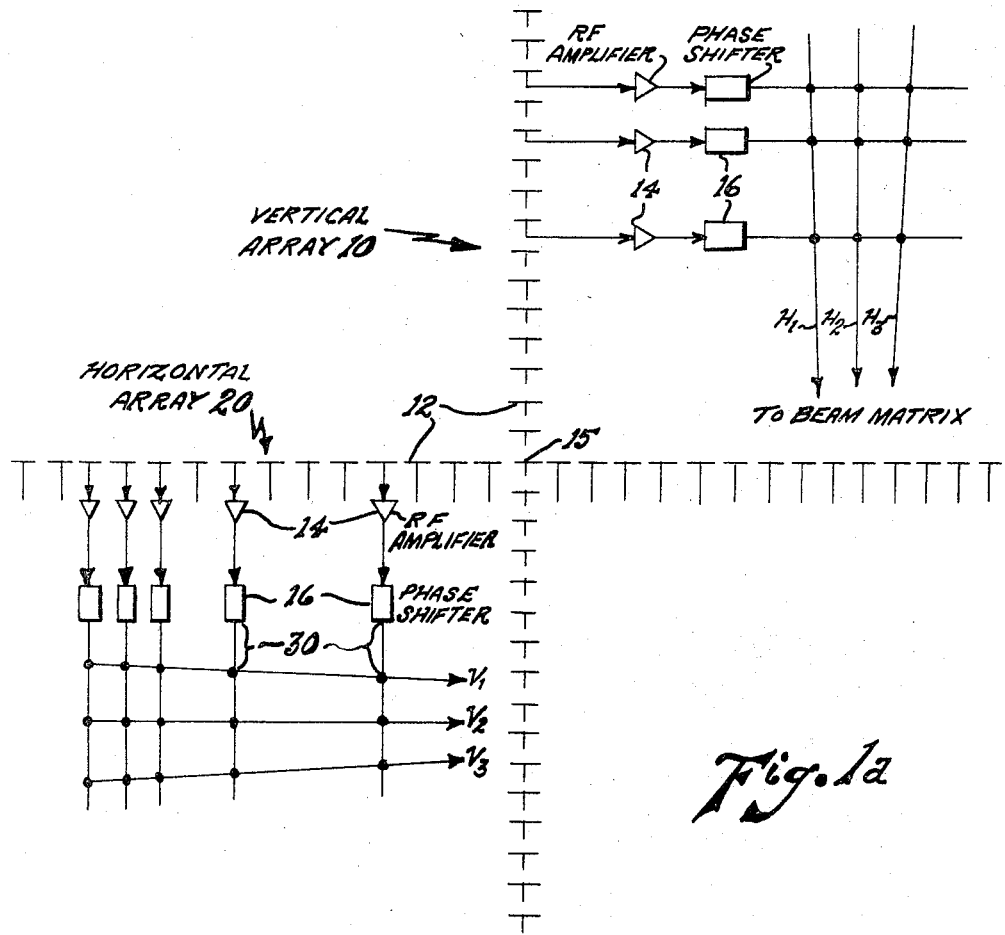
FIG. 1a is a general view of crossed line arrays.
Figure 1B:
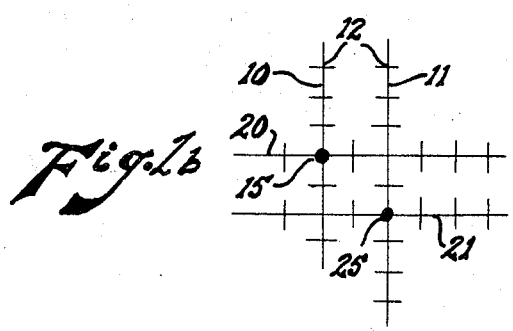
FIG. 1b illustrates a first and second pair of crossed line arrays having their centers in physically different locations.
Figure 1C:
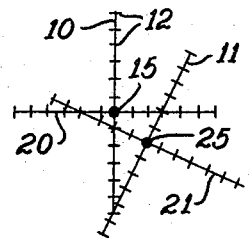
FIG. 1c illustrates a first and second pair of crossed line arrays both angularly displaced and having their centers in physically different locations.
Figure 2:
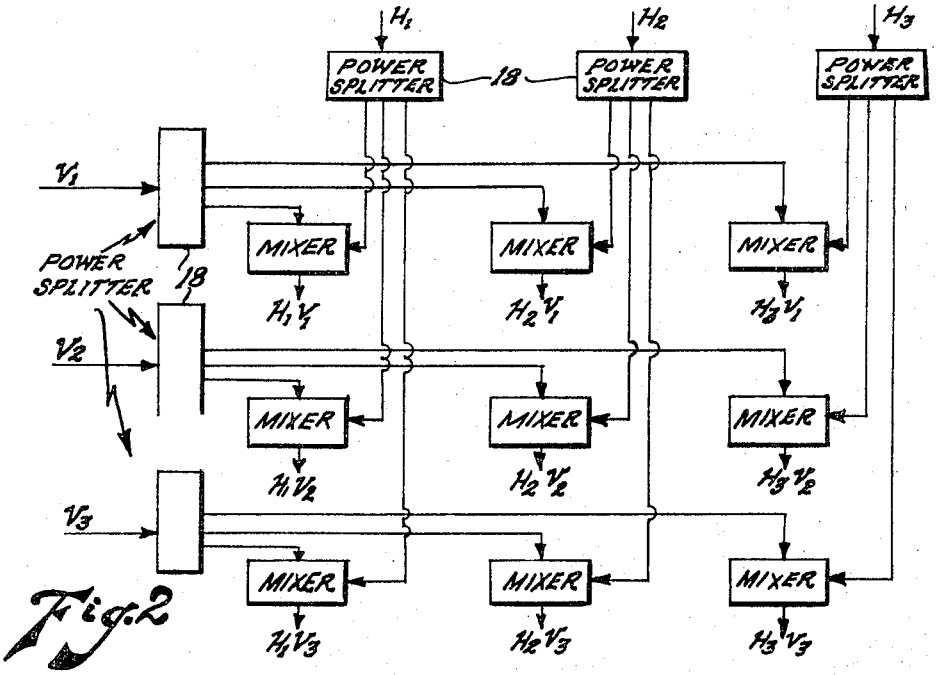
FIG. 2 illustrates a 3 x 3 beam forming matrix.

Now referring to FIG. 1, shown is a general view of crossed line arrays. Each antenna element 12 is shown to be a dipole, although any antenna element will do. Spacing between antenna elements 12 is usually one-half wavelength. It is to be noted that line arrays 10 and 20 have a common center element; for example, common antenna 15 in FIG. 1a and elements 15 and 25 in FIG. 1b. In FIG. 1c it is to be noted that line arrays 11 and 21 are angularly displaced with respect to line arrays 10 and 20. If there is no common center element, compensation has to be made in the beam-forming matrix (FIG. 2). The line length 30 feeding each fan beam summation line, $H_1$, $H_2$, $H_3$, $V_1$, $V_2$, $V_3$, varies uniformly across the array and is different for each summation line. This variation provides the desired phase gradient for each fan beam. vention that common center elements 15 and 25 of crossed line arrays 10, 20 and 11, 21 be in physically different locations.

FIG. 2 illustrates a 3 x 3 beam forming matrix. Outputs $H_1V_1 \ldots H_NV_N$ are the cross-over points for the horizontal and vertical fan beams. These are not true pencil beams. True pencil beams would result if the array were full; i.e. $N_V \times N_H$ elements and there would not be any correlation problem. It is to be noted that although the line lengths 30 have been shown schematically, in actual practice these line lengths are very carefully matched. False targets will appear in general whenever two or more targets are received at the same time.

For a proper understanding of the invention, it is necessary to consider the following analysis:

The symbol $\alpha^V$ represents the amplitude of the vector sum of all received signals with the phase gradient $\phi^V$. The symbol $\psi^V$ represents the phase difference between the phase of this vector sum and the phase of the internal reference signal at the reference element of the line array (usually numbered zero). The symbol $\phi^V$ represents the phase gradient along the vertical line array which determines the vertical direction angle of these targets. The superscript V is changed to H when referring to the horizontal line array.

Each pair of crossed line arrays will generate two sets of $\alpha$, $\psi$ and $\phi$. If the reference elements of both line arrays are identical elements, then a target will have four symbols describing that target, i.e. $\alpha$, $\psi$, $\phi^V$ and $\phi^H$.

If there were only one target, then its four symbols would be $\alpha_{11}$, $\psi_{11}$, $\phi^V{}_1$, $\phi^H{}_1$, and the symbols determined by each of the two line arrays would be $\alpha^V{}_1$; $\psi^V{}_1$; $\phi^V{}_1$; $\alpha^H{}_1$; $\psi^H{}_1$ and $\phi^H{}_1$ where in this case of only one target $\alpha^V{}_1 = \alpha^H{}_1 = \alpha_{11}$ and $\psi^V{}_1 = \psi^H{}_1 = \psi_{11}$. Whenever $\alpha$ and $\psi$ of one line array are the same as a pair of $\alpha$ and $\psi$ of the other line array, then it could be said that these belong to the same target.

However, even this simple correlation could be wrong, if there were several targets (at least 3) where combinations of two or more targets have a common phase gradient, resulting in a line array providing a single output for these targets. The instant invention provides a means of overcoming this difficulty.

A numbering sequence has to be adopted for the possible target positions, the targets resolved by one line array and the targets resolved by the other line array.

$\phi^V_1$, $\phi^V_2$, $\phi^V_3$, $\phi^V_4$ etc. are used for the phase gradients as resolved by the vertical (V) line array.

$\phi^H_1$, $\phi^H_2$, $\phi^H_3$, $\phi^H_4$ etc. are used for the phase gradients as resolved by the horizontal (H) line array.

$\psi^V_1$, $\psi^V_2$, $\psi^V_3$ and $\alpha^V_1$, $\alpha^V_2$, $\alpha^V_3$ etc. are used for the $\psi$'s and $\alpha$'s as found by the vertical line array.

$\psi^H_1$, $\psi^H_2$, $\psi^H_3$ and $\alpha^H_1$, $\alpha^H_2$, $\alpha^H_3$ etc. are used for the $\psi$'s and $\alpha$'s as found by the horizontal line array.

$\phi^V_1$, $\psi^V_1$, $\alpha^V_1\alpha$ represent the three symbols for all targets that have $\phi^V_1$ as a vertical phase gradient.

The four symbols representing the targets for each of the possible positions are: $\alpha_{11}$, $\psi_{11}$, $\phi^V_1$, and $\phi^H_1$, which represent the target location that has the vertical phase gradient of $\phi^V_1$ and the horizontal phase gradient of $\phi^H_1$.

Other groups of symbols representing other possible targets are:

$\alpha_{12}$; $\psi_{12}$; $\phi^V_1$ and $\phi^H_2$
$\alpha_{13}$; $\psi_{13}$; $\phi^V_1$ and $\phi^H_3$
$\alpha_{21}$; $\psi_{21}$; $\phi^V_2$ and $\phi^H_1$
$\alpha_{31}$; $\psi_{31}$; $\phi^V_3$ and $\phi^H_1$
$\alpha_{32}$; $\psi_{32}$; $\phi^V_3$ and $\phi^H_2$ The first subscript of $\alpha$ and $\psi$ corresponds to the position described by the vertical phase gradient with the same subscript. The second subscript corresponds to the position described by the horizontal phase gradient with the same subscript.

The vector $\alpha^V_1 \overline{\psi}^V_1$ which has a phase gradient of $\phi^V_1$ is the vector sum of all actual targets that have the phase gradient $\phi^V_1$. If all possible target locations containing the phase gradient $\phi^V_1$ are grouped then all the real targets with a phase gradient $\phi^V_1$ will be included. All others in this group are false targets whose symbol $\alpha$ will be equal to zero.

Therefore, the vector equation for $\alpha^V_1 \psi^V_1$ can be written:

$$\alpha_1^V \overline{\psi} = \alpha_{11}\overline{\psi}_{11} + \alpha_{12}\overline{\psi}_{13} + \alpha_{13}\overline{\psi}_{13} + \alpha_{14}\overline{\psi}_{14}, \text{ etc.}$$

There will be as many terms on the right side as there are horizontal phase gradients.

Other similar equations, all with the same number of vectors (but different), can be written for as many vertical phase gradients as there are.

The equations for the horizontal vectors can also be written:

$$\alpha_1^H \overline{\psi}_1^H = \alpha_{11}\overline{\psi}_{11} + \alpha_{21}\overline{\psi}_{21} + \alpha_{31}\overline{\psi}_{31} + \alpha_{41}\overline{\psi}_{41}$$
$$\alpha_2^H \overline{\psi}_2^H = \alpha_{12}\overline{\psi}_{12} + \alpha_{22}\overline{\psi}_{22} + \alpha_{32}\overline{\psi}_{32} + \alpha_{42}\overline{\psi}_{42}$$

In each vector equation, there must be at least one vector on the right side representing a real target. If by some other means the false target locations could be eliminated, the equations would become simpler.

Every vector appearing on the right side of the vertical group of equations will appear in the horizontal group of equations.

If there were $m$ vertical phase gradients resolved and $n$ horizontal phase gradients, then there will be a total of $m+n$ vector equations involving $m \cdot n$ unknown vectors. It can easily be seen that if $m \cdot n$ exceeds $m+n$, that solutions for the unknown vectors will not be possible. In this case, more equations must be obtained. A third group of equations can be obtained if another line array is added parallel to the first horizontal line array. The $\alpha$, $\psi$, and $\phi$'s of this line array can be found as in the first line array. However, since this line array has the same phase gradients as the first horizontal line array, the problem is easier.

A change in the symbols is now required. The superscript H0 will refer to the first horizontal line array, and the superscripts H1, H2, H3, etc. will refer to the second, third, fourth, etc. horizontal line arrays. Similarly, V0, V1, V2, V3 will refer to the first, second, third, fourth, etc. vertical line arrays. If the spacings of the horizontal line arrays are equal to the spacings of the elements in the vertical line array, and the spacings of the vertical line arrays are equal to the spacings of the elements in the horizontal line arrays, then it becomes a simple matter to write down the additional sets of vector equations. This is because the amplitude $\alpha$ and the phase gradients $\phi^V$ and $\phi^H$ for the possible targets do not change when taken with respect to the new line arrays. The only symbol that changes when a new line array is used is $\psi$. For the second horizontal line array, $\psi_{11}$ (located by $\phi^V_1$ and $\phi^H_1$) changes to $\psi_{11}+\phi^V_1$, $\psi_{21}$ (located by $\phi^V_2$ and $\phi^H_1$) changes to $\psi_{21}+\phi^V_2$, etc. For the third horizontal line array the preceding $\phi^V$'s are multiplied by two. If the first horizontal line array is #0; the second, #1; the third #2, etc. and #1; #2; #3; etc. are those line arrays located on the other side of the first (#0) line array, then the increase in $\psi_{ab}$ is equal to $n\phi^V a$, where $n$ equals the number of the horizontal rows ($a = 1, 2, 3, 4, 5$, etc. and $b = 1, 2, 3, 4, 5$, etc.).

For horizontal row #1, the vector equations are:

$$\alpha_1^{H0}\overline{\psi}_1^{H0} = \alpha_{11}\overline{\psi}_{11} + \alpha_{21}\overline{\psi}_{21} + \alpha_{31}\overline{\psi}_{31} + \text{ etc.}$$
$$\alpha_2^{H0}\overline{\psi}_2^{H0} = \alpha_{12}\overline{\psi}_{12} + \alpha_{22}\overline{\psi}_{22} + \alpha_{32}\overline{\psi}_{32} + \text{ etc.}$$

For horizontal row #1, the vector equations are:

$$\alpha_1^{H1}\overline{\psi}_1^{H1} = \alpha_{11}\overline{\psi}_{11} + \phi_1^V + \alpha_{21}\overline{\psi}_{21} + \phi_2^V + \alpha_{31}\overline{\psi}_{31} + \phi_3^V + \text{ etc.}$$
$$\alpha_2^{H2}\overline{\psi}_1^{H2} = \alpha_{12}\overline{\psi}_{12} + \phi_1^V + \alpha_{22}\overline{\psi}_{22} + \phi_2^V + \alpha_{32}\overline{\psi}_{32} + \phi_3^V + \text{ etc.}$$

For horizontal row #$n$, the vector equations are:

$$\alpha_1^{Hn}\overline{\psi}_1^{Hn} = \alpha_{11}\overline{\psi}_{11} + n\phi_1^V + \alpha_{21}\overline{\psi}_{21} + n\phi_2^V + \alpha_{31}\overline{\psi}_{31} + n\phi_3^V$$

Similarly, for vertical row #$m$, the vector equations are:

$$\alpha_1^{Vm}\overline{\psi}_1^{Vm} = \alpha_{11}\overline{\psi}_{11} + m\phi_1^H + \alpha_{12}\overline{\psi}_{12} + m\phi_2^H + \alpha_{13}\overline{\psi}_{13} + m\phi_3^H$$
$$\alpha_2^{Vm}\overline{\psi}_2^{Vm} = \alpha_{21}\overline{\psi}_{21} + m\phi_1^H + \alpha_{22}\overline{\psi}_{22} + m\phi_2^H + \alpha_{23}\overline{\psi}_{23} + m\phi_3^H$$

To simplify the problem, the target identification method described in my copending application, Ser. No. 393,797, entitled; Multiple Target Tracking System, filed even date herewith, can initially process the target data. This would eliminate many of the possible target locations that do not contain targets and indicate which of the remaining possible locations might not contain a target. Also, the additional line arrays required for this correlation method will result in new sets of vector equations containing the same unknown quantities.

The instant method of correlation of multiple targets when resolved by line arrays linearly displaced is the second method. The first method (in my co-pending application, above cited) while much simpler and more direct, results sometimes in correlation where there are no targets. The method described herein while more complex, results in a more complete correlation. This method has not been examined for the condition (if any) under which correlation will occur for a location where there is not a target.

The instant method of correlation has one basic advantage over the previous method; actual values for the two additional quantities $\alpha$ and $\psi$ describing the target are found. These quantities are useful for such things as range resolution and relative echo size.

This invention is similar to the correlation scheme using line arrays angularly displaced, in that no circuit or block diagram is necessary to implement it. Once the values for $\alpha$, $\psi$, $\phi_V$ and $\phi_H$ have been determined for each "target" as resolved by each line array, all that is required is to feed this information to a computer that has been programmed to solve the vector equations.

Figure 3:
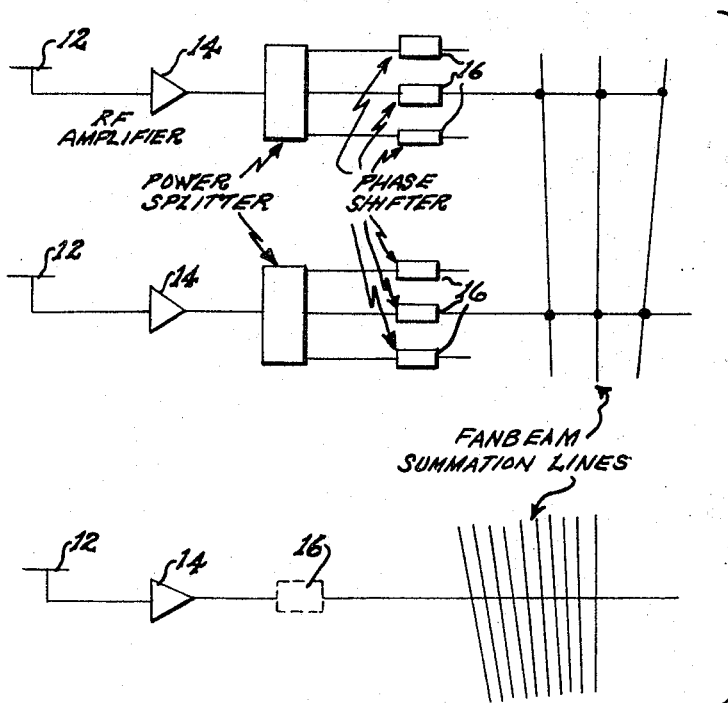
FIG. 3 illustrates alternate arrangements for each antenna element.

Obviously, many modifications and variations of the instant invention are possible in light of the above teachings. For example, FIG. 3 illustrates alternate arrangements which could be used for each antenna element 12. In one arrangement, any number of phase shifters 16 could coact with a particular power splitter 18, each feeding a different set of any desired number of fan beam summation lines. Also shown in FIG. 3 is an arrangement wherein phase shifter 16 is not necessary unless intermediate beam positions are desired.

It is, therefore, to be understood that within the scope of the appended claim, the invention may be practiced otherwise than as specifically described.

I claim:

Apparatus for resolving a multiplicity of target locations comprising: a first crossed line array, a second crossed line array linearly displaced from said first crossed array and having its center in a physical location different from the geometric center of said first crossed array and computer means for processing data output from said arrays to identify presence or absence of targets in airspace.

References Cited
UNITED STATES PATENTS 2,245,660  6/1941  Feldman et al. ___ 343—100.6 X
2,415,088  2/1947  Dingley.

RODNEY D. BENNETT, *Primary Examiner.*

CHESTER L. JUSTUS, *Examiner.*

B. L. RIBANDO, *Assistant Examiner.*